April 8, 1958 H. KAZIS ET AL 2,829,435
METHODS AND APPARATUS FOR USE IN DENTISTRY
Filed July 13, 1954 4 Sheets-Sheet 1
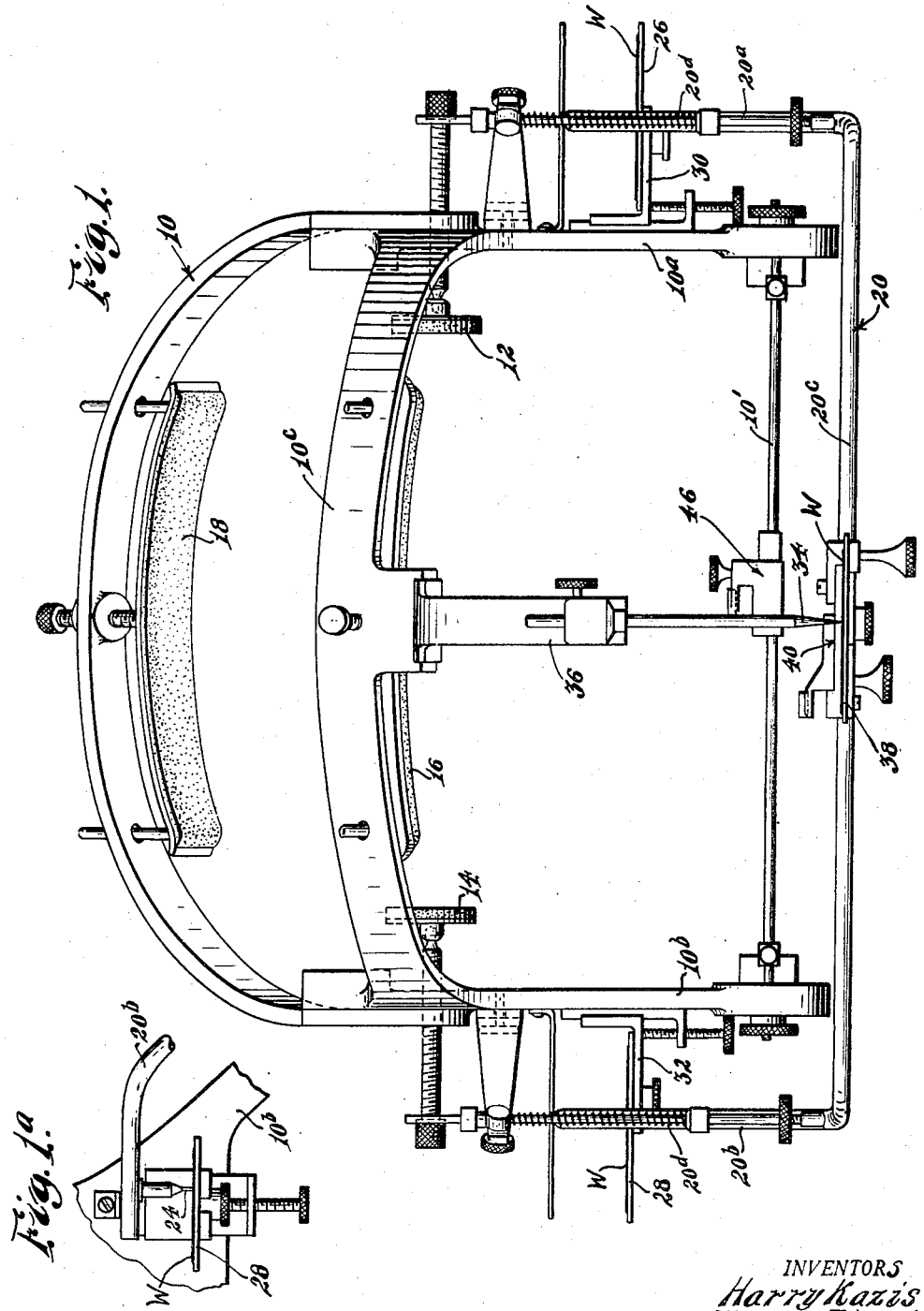
INVENTORS
Harry Kazis
BY Albert J. Kazis
John H. McKenna
Attorney.

April 8, 1958 H. KAZIS ET AL 2,829,435
METHODS AND APPARATUS FOR USE IN DENTISTRY
Filed July 13, 1954 4 Sheets-Sheet 2
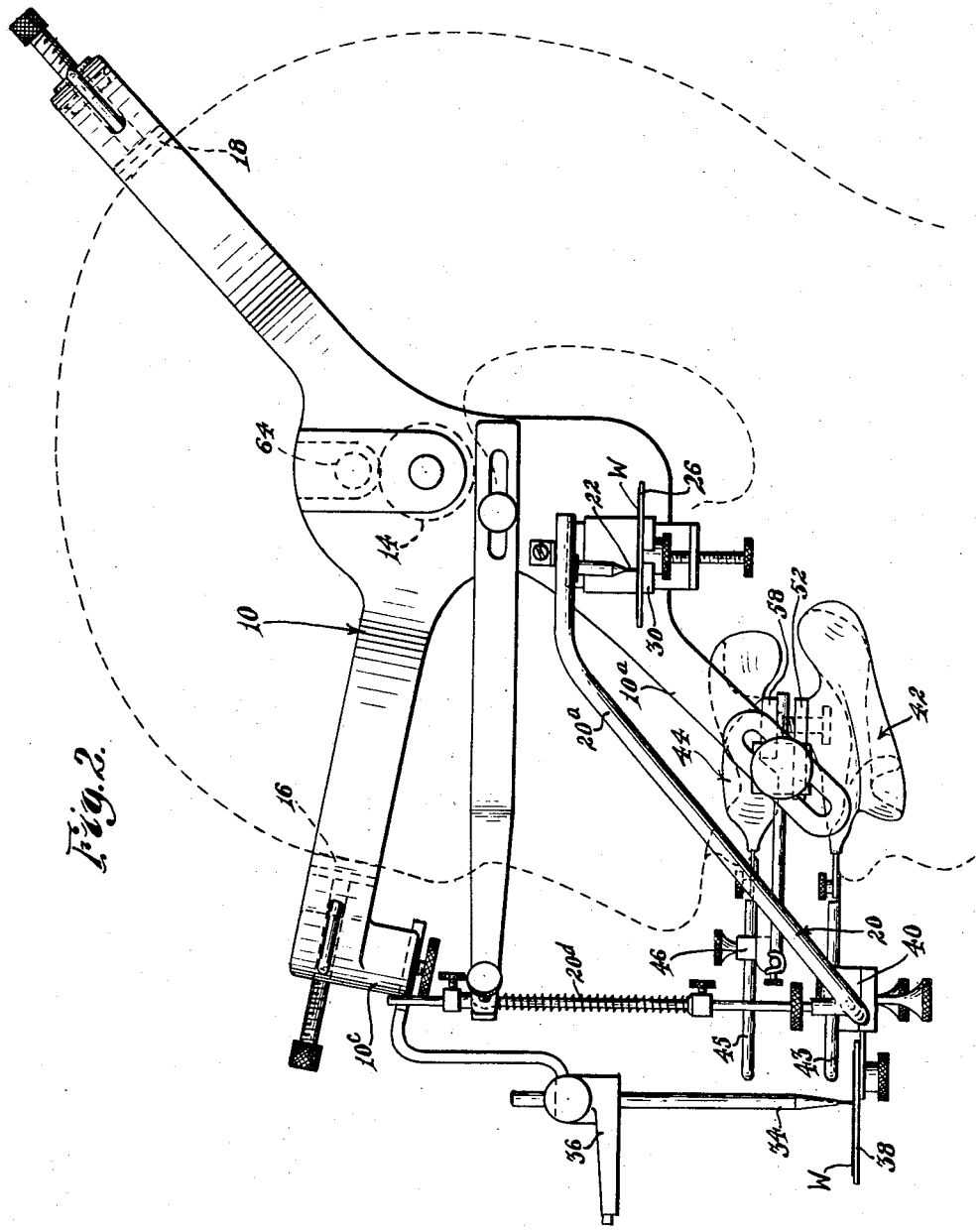
INVENTORS.
Harry Kazis
BY Robert J. Kazis
John K. McKenna
Attorney.

April 8, 1958 H. KAZIS ET AL 2,829,435
METHODS AND APPARATUS FOR USE IN DENTISTRY
Filed July 13, 1954 4 Sheets-Sheet 3
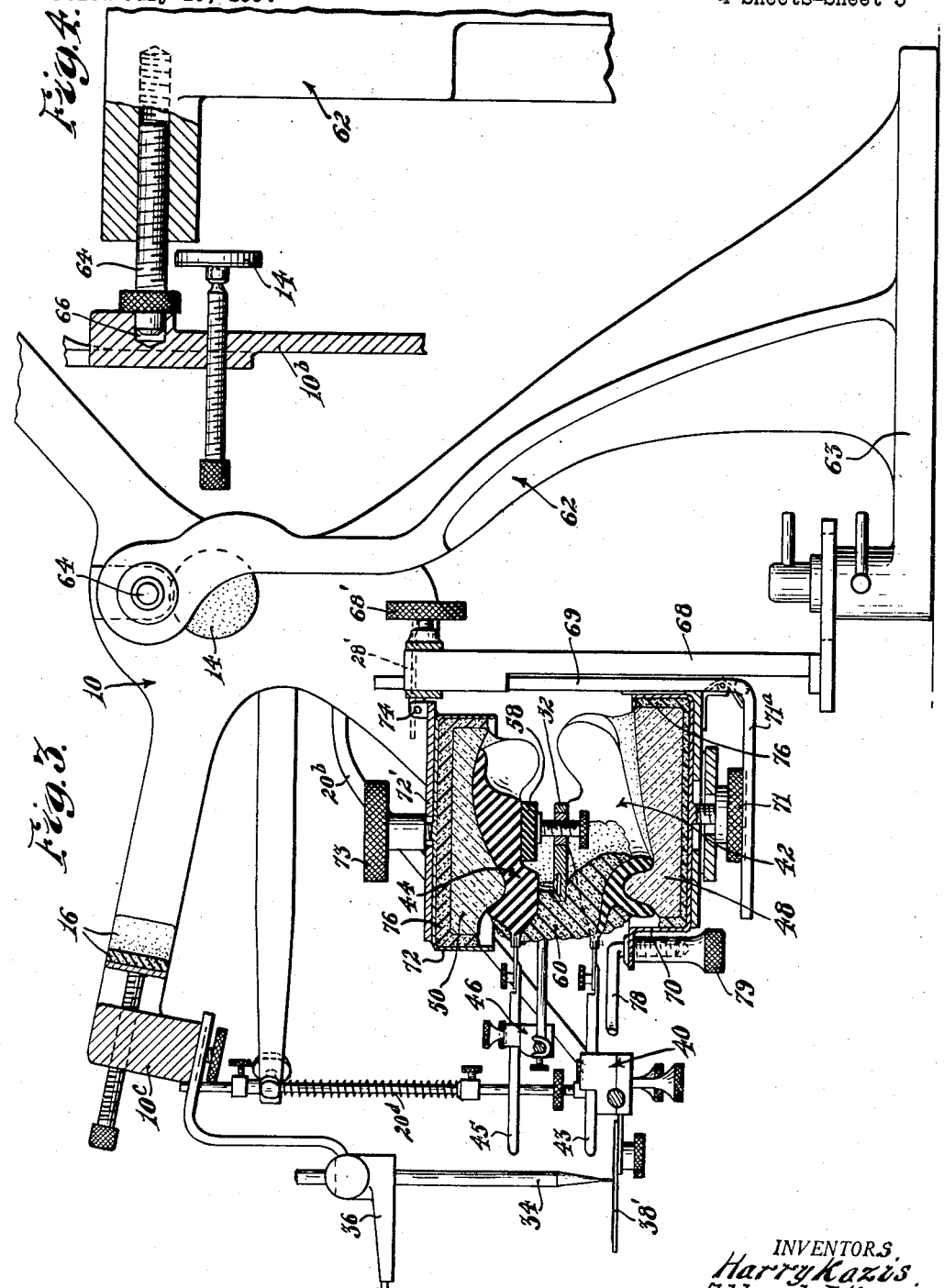
INVENTORS.
Harry Kazis
Albert J. Kazis.
BY John H. McKenna
Attorney.

April 8, 1958 H. KAZIS ET AL 2,829,435
METHODS AND APPARATUS FOR USE IN DENTISTRY
Filed July 13, 1954 4 Sheets-Sheet 4
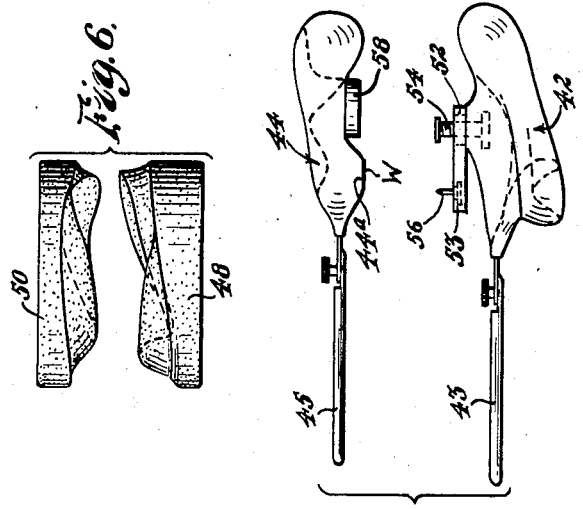
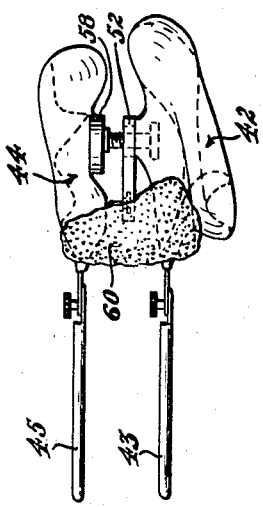
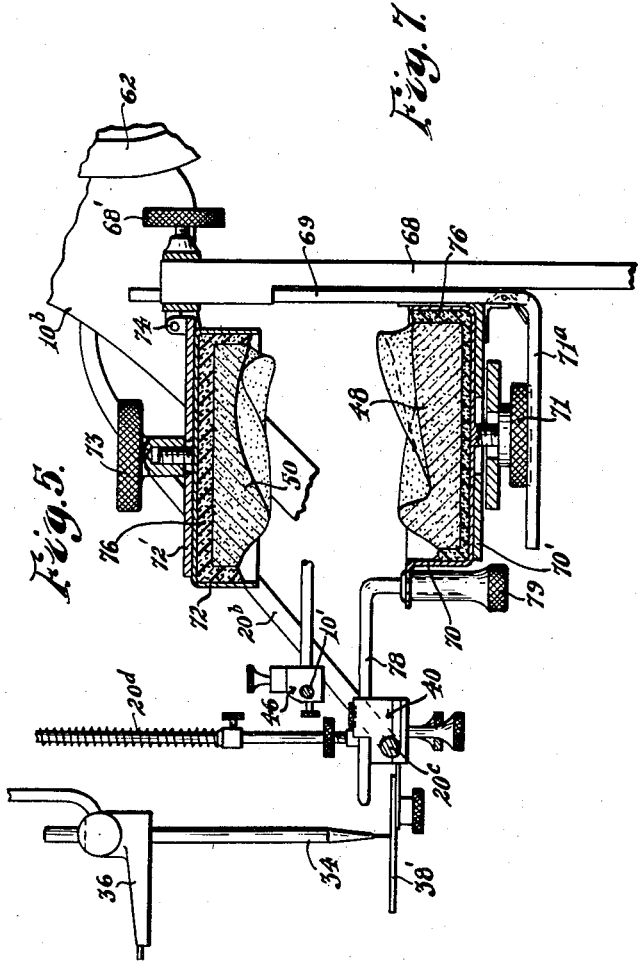
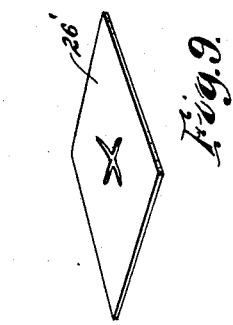
INVENTORS
Harry Kazis
Albert J. Kazis
BY
John H. McKenna
Attorney.

United States Patent Office 2,829,435
Patented Apr. 8, 1958

2,829,435

METHODS AND APPARATUS FOR USE IN DENTISTRY

Harry Kazis and Albert J. Kazis, Newton, Mass.

Application July 13, 1954, Serial No. 443,078

12 Claims. (Cl. 32—19)

This invention relates to improvements in methods and apparatus for use in dentistry, and more particularly to improved procedures and apparatus whereby individual mandibular and maxillary characteristics of any particular patient may be determined and recorded more accurately, and be simulated with greater fidelity in articulating mechanism, as compared with the prior comparable procedures and apparatus of which we are aware.

It is among the objects of the invention to provide a method and apparatus whereby the mandibular movements of a patient may be accurately recorded extraorally and whereby casts of the recordings may be utilized in articulating mechanism for guiding a manual precise and accurate simulation of the patient's mandibular movements in the articulating mechanism.

Another object of the invention is to provide a method and apparatus whereby intra-oral mandibular and maxillary devices in a patient's mouth may be relatively positioned to provide a predetermined proper vertical spacing of the devices, after which the intra-oral mandibular device may be moved with the patient's mandible to effect extra-oral recordings of the lateral and forward and backward movements of the mandible, the said recordings including a recording of the centric position of the mandible, and the said intra-oral devices being adapted to be rigidly secured together, with the mandibular device in its centric position, preparatory to transfer of the rigidly connected intra-oral devices from the patient's mouth to an articulating mechanism.

A further object of the invention is to provide a dental apparatus wherein a frame is transferable between a patient's head and an articulator standard, and wherein intraoral mandibular and maxillary devices, when in the mouth of a patient, may be connected to the frame while the latter is on the head of the patient, and may be removed as a rigid unit from the patient's mouth and be connected in the same relation to the frame when the latter is transferred to the articulator standard.

Yet another object of the invention is to provide a dental apparatus wherein an articulating mechanism has a pair of oppositely disposed receptacles of which one is hinged for movements toward and from the other, and wherein intra-oral mandibular devices which initially are relatively movable within the mouth of a patient, ultimately may be rigidly secured together within the mouth of the patient in a predetermined relationship, and then be transferred as a unit to said receptacles of the articulating mechanism, thereby to guide a proper relative positioning of casts of the patient's mandible and maxilla which will have been fixed within the receptacles.

It is, moreover, our purpose and object generally to improve upon prior dental procedures and prior dental apapratus, and especially such procedures and apparatus for aiding in the production of full or partial dentures, and in the capping of natural teeth.

In the accompanying drawings:

Fig. 1 is a front elevation of dental apparatus embodying features of the invention, the intra-oral mandibular and maxillary devices which fit within the patient's mouth being omitted;

Fig. 1a is a fragmentary side elevation showing the recording pin at the left side of the apparatus of Fig. 1;

Fig. 2 is a side elevation of the apparatus of Fig. 1 mounted on the head of a patient and showing the intraoral mandibular and maxillary devices within the mouth;

Fig. 3 is a side elevation, with portions in cross-section, showing the apparatus of Fig. 2 mounted on an articulator standard, and showing the intra-oral mandibular and maxillary devices transferred from the patient's mouth to the articulator mechanism;

Fig. 4 is a fragmentary cross-sectional view showing the mounting means for the apparatus of Fig. 3 at one side of the articulator standard;

Fig. 5 is a fragmentary view generally similar to Fig. 3 but showing the articulator receptacles after the intra-oral mandibular and maxillary devices have been removed;

Fig. 6 shows, in side elevation, the stone casts of the mandible and maxilla;

Fig. 7 shows, in side elevation, the mandibular and maxillary devices in separated relationship;

Fig. 8 is a side elevation of the matrix-joined mandibular and maxillary devices; and Fig. 9 is a perspective view of one of the cast metal plates which are substituted for the wax-holding plates.

Referring to the drawings, and more particularly to Figs. 1 and 2 thereof, the apparatus of the invention comprises a rigid frame indicated generally at 10 which is adapted to be removably mounted on a patient's head by means of the screw-actuated pressure pads 12, 14, 16 and 18. Pads 12, 14 are arranged on frame 10 for engaging opposite sides of the patient's head. Pad 16 is arranged for engaging the forehead, and pad 18 is arranged for engaging an upper rear part of the head. The rigid frame 10 has a generally U-shaped sub-frame 20 movably and adjustably mounted thereon for effecting accurate extra-oral recordings of right and left movements and forward and backward movements of the patient's mandible relative to a determined centric position of the mandible.

Sub-frame 20 has two pins 22, 24 adjustably mounted thereon, the pin 22 depending from the U-arm 20a at the right side of the frame in Fig. 1, and the pin 22 depending from the U-arm 20b at the left side of the frame in Fig. 1. The lower pointed end of pin 22 is adjusted to be in marking engagement with wax W on the upper surface of a plate element 26, and the lower pointed end of pin 24 is adjusted to be in marking engagement with wax W on the upper surface of a plate element 28. The plate elements 26, 28 are removably supported on brackets 30, 32, respectively, and these brackets are adjustable on the side portions 10a, 10b, respectively, of frame 10.

A third and longer pin 34 depends from a bracket 36 which is adjustably mounted on frame part 10c which extends from side to side of frame 10 in front of the forehead of the patient. Pin 34 is adjustable in its bracket with its lower pointed end adapted to be fixed in marking engagement with wax W on the upper surface of a plate member 38. This third plate element 38 is removably supported on a carriage 40 which may be secured in adjusted positions along the bridge part 20c of the relatively movable subframe 20.

Separate intra-oral mandibular and maxillary devices are indicated in Fig. 7 generally at 42 and 44 respectively, each adapted to be fitted within the patient's mouth. The mandibular device 42 fits on the patient's mandible and has the rod element 43 adjustably rigid thereon for projecting out of the mouth. Its outer end portion is adapted to be adjustably clamped to the carriage 40 on bridge part 20c of the sub-frame 20. The maxillary device 44 fits on the patient's maxilla and has the rod element 45 adjustably rigid thereon for projecting out of the mouth. Its outer end portion is adapted to be clamped to a carriage 46 which may be secured in adjusted positions along the cross-rod element 10' which is rigid on frame 10.

The intra-oral devices 42, 44 are formed of plastic material which is shaped to fit the particular patient's mandible and maxilla. Actually, various conventional procedures are followed prior to use of our improved apparatus. Initially, the patient may be required to hold the mouth wide open until the mandible muscles become tired, after which the mandible assumes its natural relaxed vertical position with respect to the maxilla. This relaxed vertical spacing of mandible and maxilla is measured and from three to five millimeters deducted from the actual measurement to allow for functional movements. This gives the proposed vertical height or vertical relationship of mandible and maxilla. Wax impressions then are made of the intra-oral contours of the mandible and maxilla and stone casts 48, 50 (Fig. 6) are made of the mandible and maxilla contours from these wax impressions. The plastic intra-oral devices 42, 44 are formed on the stone casts.

As best seen in Fig. 7, the intra-oral mandibular device 42 is equipped with a rigid cross-piece 52 in which a screw 54 is manually adjustable. Also, this cross-piece 52 has a forward-projecting part 53 in which a pin 56 is mounted. The intra-oral maxillary device 44 has a block or mass 58 of rubber, or the like, secured thereon opposite screw 54 for engaging an end portion of the screw when the mandible is closed toward the maxilla. A generally flat surface portion 44a of the device 44 has wax W thereon opposite pin 56 and the point of pin 56 is adapted to engage and mark the wax to effect intra-oral recordings of mandible movements. Screw 54 is adjusted until the patient experiences a comfortable degree of pressure when the mandible is moved as far as it will go toward the maxilla. At this time also, the pin 56 will come into marking engagement with the wax W on surface portion 44a.

The patient now moves his mandible to right and left and forward and backward to effect intra-oral recording to these movements on the wax W which establishes the centric position of the mandible at the point of intersection of the wax markings.

It is at this stage that the frame 10 is mounted on the patient's head. Rod element 43 of intra-oral device 42 may then be secured to carriage 40 of sub-frame 20, and rod element 45 of intra-oral device 44 may be secured to carriage 46 on frame 10. The carriages 40 and 46 will be adjusted to clamp the respective rod elements with the patient's mandible in the intra-orally recorded centric position, after which spring tension means at 20d on each sub-frame U-arm 20a, 20b may be adjusted to attain a substantially balanced condition of sub-frame 20.

The apparatus is now ready for extra-oral recording of the patient's mandible movements on the previously described wax-carrying plates 26, 28 and 38.

Heretofore, so far as we are aware, any intra-oral recording of mandible movements could not be utilized with any degree of accuracy in connection with extra-oral denture-making or teeth-capping procedures. Only the intra-oral recordation of the centric position of the mandible has been helpful heretofore in extra-oral work.

According to the invention, the intra-oral maxillary device 44 becomes fixed to frame 10 when its rod element 45 is clamped to the adjusted carriage 46. The intra-oral mandibular device 42, however, after it is clamped to the sub-frame 20, can move with the patient's mandible to effect movements of sub-frame 20, and of the pins 22, 24 and plate element 38 which are carried thereon. Hence, when the mandible is moved from its intra-orally determined centric position in right and left lateral directions and in forward and backward directions, wax recordings are made on the plate elements 26, 28, 38. The recording on plate element 26 at the right side of the patient's head (Fig. 1) includes a representation of the thrust and of movements of the muscles and of the temporomandibular joint at the left side of the head. Similarly, the recording on plate element 28 at the left side of the head (Fig. 1) includes a representation of the thrust and of movements of the muscles and of the temporomandibular joint at the right side of the head. The recording on the front plate element 38 includes a representation of a composite of the thrust and movements of muscles and temporomandibular joints at both sides of the head.

Having obtained the extra-oral recordings of mandible movements, the intra-oral devices 42, 44 are secured together with the mandibular device 42 in its centric position. This is accomplished by plaster 60, inserted into the patient's mouth, and formed as a matrix between and around the intra-oral devices 42, 44. When the plaster sets, the devices 42, 44 become firmly held against any relative movement.

The rods 43, 45 of the devices 42, 44 now may be released from the carriages 40, 46 preparatory to removal of frame 10 from the patient's head while leaving the plaster-joined intra-oral devices 42, 44 in the patient's mouth.

Either before or after removal of frame 10 from the patient's head, the wax recordings on plate element 26, 28, 38 will be reproduced in cast metal plate elements 26', 28', 38' (Figs. 3, 9) and these latter plate elements are mounted on the frame and sub-frame in the places previously occupied by the wax-carrying plate elements 26, 28, 38.

Following removal of frame 10 from the patient's head, it is mounted on an articulator standard 62, as shown in Fig. 3. As represented, the frame 10 has the oppositely disposed screw elements 64 whose outer ends may be engaged in sockets 66 in the side members 10a, 10b, of frame 10. Obviously, the frame may be otherwise removably mounted on the standard, if desired.

A vertical post 68 is adjustably fixed on a base part 63 of the standard, and two articulator receptacles or cups 70, 72 are adjustably mounted on post 68. The receptacle 72 opens toward receptacle 70 and is hinged at 74. It is adjustable on its hinged supporting member 72' and may be clamped in any adjusted position thereon by the clamping nut 73. However, this receptacle 72 can be swung away from receptacle 70 about the hinge at 74.

Receptacle 70 is adjustably mounted on its supporting member 70' which is rigid on a vertical slide bar 69 which may be secured at selected elevations by the clamping screw 68'. The receptacle 70 may be secured in adjusted position on supporting member 70' by the clamping nut 71. A spring-pressed bar 71a constantly engages nut 71 to frictionally maintain it against accidental loosening.

The initially prepared stone casts 48, 50, of mandible and maxilla, are secured within the receptacles 70, 72 by plaster 76, or the like, the cast 48 being in receptacle 70 and cast 50 in receptacle 72.

Referring to Figs. 3, 8, the matrix-joined intraoral devices 42, 44 are removed from the patient's mouth and inserted as a unit between the casts 48, 50 in receptacles 70, 72. The mandibular device 42 nicely fits the cast 48 inasmuch as it was formed on this cast. The maxillary device 44 nicely fits the cast 50 inasmuch as it was formed on cast 50. The receptacles will be adjusted as needed to nicely fit the casts to the devices 42, 44, care being taken to locate the projecting rod 43 of the mandibular device 42 over an adjustable rod 78 on the lower receptacle 70. The projecting rods 43, 45 now may be secured to the frame carriages 40, 46, as in Fig. 3, after which the receptacle 72 may be clamped to its hinged supporting member 72' by tightening nut 73. Receptacle 70 may be clamped to its supporting member 70′ at this adjusting stage by tightening nut 71, but it is a feature of the invention that receptacle 70 may have substantial relatively free movement on supporting member 70′ when the nut is loosened, for a purpose which later will appear.

The intra-oral mandibular and maxillary devices 42, 44 now will be found to be secured to fixed frame 10 and movable frame 20 the same as when the frame 10 was on the patient's head. Also, the casts 48, 50 will be precisely in the same relation as the patient's mandible and maxilla. Hence, by removing the matrix joined intra-oral devices 42, 44 while preserving the attained relationship of casts 48, 50, dentures, or partial dentures which may include caps for natural teeth, may be made on the casts 48, 50 with assurance that they will accurately fit and satisfactorily perform when placed in the patient's mouth.

The intra-oral devices 42, 44 may be removed as a unit by releasing their rods 43, 45 and swinging the upper receptacle 72 away from the lower receptacle. The adjustable rod 78 on lower receptacle 70 is then arranged and secured in carriage 40 in the place of rod 43 and its inner end is rigidly clamped to receptacle 70 by the finger nut 79. This effects an operable connection between the receptacle 70 and sub-frame 20 whereby, when nut 71 is loosened, the cast 48 in receptacle 70 may be manually moved relative to the relatively fixed cast 50 in receptacle 72.

The metal plate castings 26′, 28′, 38′ of the original extra-oral wax recordings will have been substituted for the wax-carrying plates 26, 28, 38 and these plate castings serve to positively guide movements of the pins 22, 24, 34 to simulate or duplicate the patient's recorded mandible movements when the receptacle 70 is manually urged in one direction or another. All of the previously recorded movements of the patient's mandible may be reproduced precisely and accurately in the articulating mechanism, and all of the work on the artificial dentures may be done while the casts 48, 50 are in the articulating mechanism wherein the upper receptacle 72 conveniently may be swung about its hinge 74 toward and from receptacle 70. Hence, the dentures may be perfected in the articulating mechanism with assurance that they will fit and perform properly when ultimately placed in the patient's mouth. The patient meanwhile has been relieved of the usual discomforting procedures of repeated fittings and adjustments which have been necessary heretofore in order to attain a proper bite.

The invention makes it possible to build dentures or to reconstruct natural teeth in accordance with the patient's true functional movements.

Although the invention has been herein disclosed as it may be employed in making full dentures, it should be understood that its various novel features are equally useful and advantageous for making partial dentures which may include caps for retained natural teeth, and for reconstruction of natural teeth. Also, various changes may be made in the details of the disclosed apparatus within the scope of the appended claims, and it is intended that the patent shall cover, by suitable expression in the appended claims, whatever features of patentable novelty exist in the invention disclosed.

We claim as our invention:

1. In dentistry, the method of reproducing the relationship and relative movements of a patient's maxilla and mandible in articulating mechanism, comprising arrangeing pre-formed intra-oral maxillary and mandibular devices on the patient's maxilla and mandible, mounting an extra-oral recording frame on the head of a patient to provide a relatively fixed frame portion and a relatively movable frame portion, effecting a connection between said maxillary device and said relatively fixed frame portion, effecting a connection between said mindibular device and said relatively movable frame portion, and then making extra-oral recordings of relative movements of said frame portions in response to movements of the patient's mandible relative to the maxilla, securing said devices rigidly together within the patient's mouth while the mandible is in its centric position, followed by transfer of said secured together devices and said frame from the patient to an articulating mechanism with said maxillary and mandibular devices arranged respectively on a cast of the patient's maxilla and a cast of the patient's mandible in the articulating mechanism, removing said secured-together devices after said casts have been relatively positioned in the articulating mechanism in conformity with the relative positions of the patient's maxilla and mandible at the time said devices were secured together, and guiding relative movements of said frame portions in the articulating mechanism by said extra-oral recordings to effect movements of said mandible cast relative to said maxilla cast accurately simulative of the recorded relative movements of said devices which were obtained in response to actual movements of the patient's mandible relative to the maxilla.

2. In dentistry, the method as defined in claim 1 wherein the said extra-oral recordings are in the form of grooves made in wax of which metal casts are produced, and wherein the said metal casts of the extra-oral recordings are utilized to positively attain the said guiding of relative movements of said frame portions in the articulating mechanism.

3. In dentistry, the method as defined in claim 1 wherein the said connection between said maxillary device and said relatively fixed portion of said frame includes a relatively rigid element removably mounted on said maxillary device for extending out of the patient's mouth when said maxillary device is arranged on the patient's maxilla, and wherein an adjustable element of the articulating mechanism is connected to said relatively fixed portion of said frame in the place of said removably mounted element of said maxillary device prior to said removal of said secured-together devices from the articulating mechanism.

4. In dentistry, the method of reproducing the relationship and relative movements of a patient's maxilla and mandible in articulating mechanism, comprising inserting in the patient's mouth maxillary and mandibular devices cast for fitting on the patient's maxilla and mandible, respectively, and recording relative movements thereof in plastic material at a plurality of extra-oral locations in response to relative movements of the patient's maxilla and mandible, preparing metal casts of said plastic recordings, transferring the said maxillary and mandibular devices from the patient's mouth to an articulating mechanism, followed by mounting said metal casts in said articulating mechanism in the same relationship to the said maxillary and mandibular devices that said plastic recordings had to the maxillary and mandibular devices when the latter said devices were in the patient's mouth, and utilizing the said metal casts of the plastic recordings for positively guiding relative movements of said maxillary and mandibular devices in the said articulating mechanism.

5. Apparatus for use in dentistry, comprising separate intra-oral maxillary and mandibular devices having portions for fitting respectively on a patient's maxilla and mandible and each having a rigid projection for extending out of the patient's mouth, extra-oral recording mechanism having a relatively fixed portion to which said projection of said maxillary device is detachably secured and having a relatively movable portion to which said projection of said mandibular device is detachably secured, whereby the latter said portion moves relative to the first mentioned portion in response to movements of the patient's mandible relative to the maxilla, said portions of the extra-oral recording mechanism having extant at opposite sides of the patient's head and having coacting means thereon at a plurality of locations, including locations adjacent to the right and the left temporamondibular points, for extra-oral recordation of movements of the patient's manidible relative to the maxilla.

6. Apparatus for use in dentistry as defined in claim 5, wherein said extra-oral recording mechanism comprises a main frame mountable on the patient's head in an adjustably fixed position relative to the head, and an auxiliary frame movably mounted on said main frame, said detachable securement of said projection of the maxillary device being to said main frame, and said detachable securement of said projection of the mandibular device being to said auxiliary frame.

7. Apparatus for use in dentistry as defined in claim 5, wherein said intra-oral maxillary and mandibular devices have coacting means associated therewith which may be adjusted within the mouth of the patient to establish a predetermined limit of permissible relative movement of said devices toward each other, and have coacting means associated therewith for intra-oral recordation of movements of the mandible relative to the maxilla while said intra-oral devices are substantially at the said established limit of permissible movement toward each other.

8. Apparatus for use in dentistry as defined in claim 5, wherein said extra-oral recording mechanism comprises a main frame and an auxiliary frame movably mounted on said main frame, said frames being mountable as a unit on a patient's head with said main frame in an adjustable fixed position relative to the head, said detachable securements of said projections of the maxillary and mandibular devices being respectively to said main frame and said auxiliary frame.

9. Apparatus for use in dentistry as defined in claim 5, wherein said extra-oral recording mechanism comprises a main frame mountable in a relatively fixed position on the head of the patient and an auxiliary frame movably mounted on said main frame, and wherein the said detachable securements of said projections of the maxillary and mandibular devices are to said main frame and auxiliary frame respectively, said frames having coacting means thereon for recording extra-orally any relative movements of said frames in response to movements of the patient's mandible relative to the maxilla while said intra-oral devices are spaced substantially a predetermined vertical distance apart.

10. Apparatus for use in dentistry as defined in claim 5, wherein said extra-oral recording mechanism comprises a quantity of relatively soft material removably supported on one of said portions of said mechanism and an element adjustably fixed on the other said portion of said mechanism arranged and adapted to effect groove-like recordings in said relatively soft material in response to said relative movements of the patient's mandible and maxilla, said removable relatively soft material with said groove-like recordings therein being removable from its support for making a cast metal reproduction of said groove-like recordings, and said support being adapted to receive and support said cast metal reproduction in the position previously occupied by said relatively soft material, whereby said cast metal reproduction, when on said one of said portions of said mechanism, coacts with said element on said other said portion of said mechanism for positively guiding relative movements of said relatively fixed and relatively movable portions of the recording mechanism thereby to reproduce the recorded relative movements of the patient's mandible and maxilla.

11. Apparatus for use in dentistry as defined in claim 5, wherein there is a separate articulator support on which casts of the patient's maxilla and mandible may be adjustably supported in spaced relation, and wherein said extra-oral recording mechanism is interchangeably mountable on a patient's head and on said articulator support and wherein said intra-oral maxillary and mandibular devices have a matrix of plaster rigidly securing them together in a predetermined relationship within the patient's mouth, whereby said devices, following detachment of their said projections from said portions of the extra-oral recording mechanism may be transferred as a rigid unit from the patient's mouth and be inserted between said casts on said articulating support and be secured to said extra-oral recording mechanism on the articulating support to establish a relationship of said casts precisely the same as the relationship of the patient's maxilla and mandible at the time of said rigid plaster securement together of said intra-oral maxillary and mandibular devices.

12. Apparatus for use in dentistry comprising an articulator support, a frame unit having a main frame and an auxiliary frame of which the auxiliary frame is movably mounted on the main frame, means for mounting said frame unit first on the head of a patient and subsequently on said articulator support with said main frame in relatively fixed position on the head and subsequently on the said support, intra-oral maxillary and mandibular devices pre-formed to fit on the patient's maxilla and mandible respectively, each said device having a rigid projection thereon for extending out of the mouth of the patient, means for detachably securing the projection of said maxillary device to said main frame, means for detachably securing the projection of said mandibular device to said auxiliary frame, coacting means on said frames for effecting groove-like recordings of relative movements of said frames in response to movements of the patient's mandible relative to the maxilla, means for securing said intra-oral devices rigidly together with said devices in a predetermined relationship whereby said devices may be detached from said frames and transferred as a rigid unit from the patient's mouth to said articulator support following transfer of said frame unit from the patient's head to said articulator support, casts of the patient's maxilla and mandible adjustably mounted on said articulator support and adapted to nicely fit respectively on said maxillary and mandibular devices of said rigid unit, said projections of said maxillary and mandibular devices of said rigid unit being again attached to said frames to establish a relationship of said casts corresponding to the relationship of the patient's maxilla and mandible when said intra-oral devices were secured rigidly together, means associated with said mandible cast arranged and adapted to be detachably secured to said auxiliary frame in the place of said projection of said mandibular device of the rigid unit, the said mounting of said cast of the patient's maxilla including means whereby said maxilla cast may be moved away from the mandible cast to permit removal of said rigid unit following detachment of said projections of said devices from said frames, means for mounting casts of said groove-like recording on said frames in the places of the original recordings whereby said recording casts constitute guides for relative movements of said frames on said articulator support, and means whereby the said mandible cast is movable relative to the maxilla cast to reproduce on the articulator support the movements of the patient's mandible relative to the maxilla.

References Cited in the file of this patent

UNITED STATES PATENTS

| | | |
|---|---|---|
| 1,799,528 | Phillips | Apr. 7, 1931 |
| 2,220,734 | Shanahan | Nov. 5, 1940 |